US007939687B2

(12) United States Patent
Shelekhov (10) Patent No.: US 7,939,687 B2
(45) Date of Patent: May 10, 2011

(54) SOL-GEL-POLYMER NANOCOMPOSITE AND METHODS THEREOF

(75) Inventor: Nikita Sergeevich Shelekhov, Avon (FR)

(73) Assignee: Corning Incorporated, Corning, NY (US)

( * ) Notice: Subject to any disclaimer, the term of this patent is extended or adjusted under 35 U.S.C. 154(b) by 54 days.

(21) Appl. No.: 12/614,953

(22) Filed: Nov. 9, 2009

(65) Prior Publication Data

US 2010/0130714 A1   May 27, 2010

(30) Foreign Application Priority Data

Nov. 26, 2008  (EP) .................................. 08305847

(51) Int. Cl.
*C07F 7/04* (2006.01)
(52) U.S. Cl. .......... 556/482; 556/483; 525/903; 528/26; 526/240; 526/271; 526/279
(58) Field of Classification Search .................... 528/29
See application file for complete search history.

(56) References Cited

U.S. PATENT DOCUMENTS

| | | | | |
|---|---|---|---|---|
| 4,460,639 | A | 7/1984 | Chi et al. ...................... | 428/224 |
| 4,558,076 | A * | 12/1985 | Wright et al. ................. | 523/442 |
| 4,731,264 | A | 3/1988 | Lin et al. ....................... | 427/387 |
| 5,223,862 | A | 6/1993 | Dasher et al. ................. | 351/163 |
| 5,231,156 | A | 7/1993 | Lin ................................ | 526/279 |
| 5,254,638 | A | 10/1993 | Novak et al. .................. | 525/389 |
| 5,407,887 | A * | 4/1995 | Miyashita et al. ............ | 502/258 |
| 5,962,608 | A | 10/1999 | Ryang et al. .................. | 526/89 |
| 2006/0036034 | A1* | 2/2006 | Chaves et al. ................. | 525/100 |
| 2007/0149690 | A1 | 6/2007 | Zoromski et al. ............. | 524/494 |
| 2008/0139720 | A1 | 6/2008 | Li et al. .......................... | 524/401 |

FOREIGN PATENT DOCUMENTS

| | | |
|---|---|---|
| EP | 0581576 | 2/1994 |
| JP | 04 335026 | 11/1992 |
| WO | WO00/64969 | 11/2000 |
| WO | WO03/064436 | 8/2003 |

OTHER PUBLICATIONS

Hay J., et al., "Synthesis of Organic-Inorganic Hybrids Via the Non-hydrolytic Sol-Gel Process", Chem. Mater. 2001, vol. 13, 3396-3403.
Doeuff S., et al., "Sol-gel synthesis and characterization of titanium oxo-acetate polymers", Mater. Res. Bull. 1990, 25, 1519—(Abstract only).
Touati F., et al., "Synthesis of New Hybrid Organic-inorganic Alumina Gels by the Sol-Gel Method", J. Sol-Gel Sci. Technol. 1997, 8, 595-598.
Brandhuber D., et al., "Glycol-Modified Silanes in the Synthesis of Mesoscopically Organized Silica Monoliths with Hierarchical Porosity", Chem. Mater. 2005, 17, 4262-4271.
Goutille Y., et al., "Crosslinking in the melt of EVA using tetrafunctional silane: gel time from capillary rheometry", Polymer, 200344, 3165-3171.
Tangwiwat S., et al., "Barium titanate sols prepared by a diol-based sol-gel route", J. Non-Cryst. Solids, 2005, 351, 976-980.
Eo Young-Joo, et al., "Optical characteristics of photo-curable methacryl-oligosiloxane nano hybrid thick films", J. Mater. Res., 2005, vol. 20 (2), 401-408.
Kang Eun-Seok, et al., "Synthesis and characteristics of curable siloxane-based organic-inorganic hybrid materials modified with vinyl and isopropenoxy", J. Mater. Res., 2006, 21 (5), 1286-1293.
Matsui H., et al., "Synthesis and electronic behaviors of alternating indium—organic moiety binary hybrid copolymer", J. Mater. Sci., 2006, 41, 2137-2139.
Tu Yeur-Luen, et al., "Synthesis and Electrical Characterization of Thin Films of PT and PZT Made from a Diol-Based Sol-Gel Route", J. Am. Ceram. Soc., 1996, 79 (2), 441-448.
Fornasieri G. et al., "Reactivity of Titanium Oxo Ethoxo Cluster [$Ti_{16}O_{16}(OEt)_{32}$]. Versatile Precursor of Nanobuilding Block-Based Hybrid Materials", J. Am. Chem. Soc., 2005, 127, 4869-4878.
Trabelsi S. et al., "Novel organo-functional titanium-oxo-cluster-based hybrid materials with enhanced thermomechanical and thermal properties", Macromolecules, 2005, 38, 6068-6078 (abstract only).
Tu Y.L., et al., "Processing and characterization of Pb(Zr, Ti)$O_3$ films, up to 10 µm thick, produed from a diol sol-gel route", J. Mater. Res., 1996, vol. 11 (10), 2556-2564.
Grader G.S., et al., "Modification of Non-Hydrolytic Sol-Gel Derived Alumina by solvent Treatments", J. Sol-Gel Sci. Technol., 2001, 21, 157-164.
Hajji P., et al., "Synthesis, Structure, and Morphology of Polymer-silica Hybrid nanocomposites Based on Hydroxyethul Methacrylate", G. J. Polym. Sci., 1999, Part B: Polym. Phys., 37, 3172-3187.
Novak B. M., et al., *"Inverse" organic-inorganic composite materials: high glass content non-shrinking sol-gel composites*, Mater. Sci. and Eng., 1993, A162, 257-264.
Novak B. M., "Hybrid Nanocomposite Materials-Between Inorganic Glasses and Organic Polymers", Advan. Mater., 1993, 5(6), 423-433.

\* cited by examiner

*Primary Examiner* — Marc S Zimmer
*Assistant Examiner* — Lindsay Nelson
(74) *Attorney, Agent, or Firm* — John L. Haack (57) ABSTRACT

A nanocomposite material including organic-inorganic polymeric interpenetrating networks having a low or no-shrinkage characteristic and a method for making the composite, as defined herein.

9 Claims, 3 Drawing Sheets

Fig. 2

1 micron

SOL-GEL-POLYMER NANOCOMPOSITE AND METHODS THEREOF

CROSS-REFERENCE TO RELATED CO-PENDING APPLICATION

This application claims the benefit of European Application Serial No. 08305847.9, filed Nov. 26, 2008, entitled SOL-GEL-POLYMER NANOCOMPOSITE AND METHODS THEREOF. The entire disclosure of publications, patents, and patent documents mentioned herein are incorporated by reference.

BACKGROUND

The disclosure relates generally to non-shrinking composites comprising organic and inorganic polymers and methods of making and using the composites.

SUMMARY

The disclosure provides a nanocomposite material comprised of interpenetrating organic and inorganic polymer networks having a low or no-shrinkage characteristic and to methods for making and using the nanocomposite.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Definitions

"AED" refers to Analysis of Energy dispersion.
"d" refers to density.
"DSC" refers to Differential Scanning Calorimetry.
"TGA" refers to Thermo Gravimetric Analysis.
"TMA" refers to Thermal Mechanical Analysis.
"DMA" refers to Dynamic Mechanical Thermal Analysis.
"CTE" refers to coefficient of thermal expansion.
"SEM" refers to Scanning Electron Microscopy.
"Sol-gel-polymer composite" refers to a nanocomposite material comprised of interpenetrating organic and inorganic polymer networks and prepared in accordance with the disclosure.

"Hydrocarbon," "hydrocarbyl," "hydrocarbylene," "hydrocarbyloxy," and like terms refer to monovalent such as —$R^1$ or $R^3$, or divalent —$R^2$— moieties, and can include, for example, alkyl hydrocarbons, aromatic or aryl hydrocarbons, alkyl substituted aryl hydrocarbons, alkoxy substituted aryl hydrocarbons, heteroalkyl hydrocarbons, hetero aromatic or heteroaryl hydrocarbons, alkyl substituted heteroaryl hydrocarbons, alkoxy substituted heteroaryl hydrocarbons, and like hydrocarbon moieties, and as illustrated herein.

"Alkyl" includes linear alkyls, branched alkyls, and cycloalkyls.

"Substituted alkyl" or "optionally substituted alkyl" refers to an alkyl substituent, which includes linear alkyls, branched alkyls, and cycloalkyls, having from 1 to 4 optional substituents selected from, for example, hydroxyl (—OH), halogen, amino (—$NH_2$), nitro (—$NO_2$), alkyl, acyl (—C(=O)R), alkylsulfonyl (—S(=O)$_2$R) or alkoxy (—OR). For example, an alkoxy substituted alkyl, can be a 2-methoxy substituted ethyl of the formula —$CH_2$—$CH_2$—O—$CH_3$, a 1-dialkylamino substituted ethyl of the formula —$CH_2$($NR_2$)—$CH_3$, and like substituted alkyl substituents.

"Aryl" includes a mono- or divalent-phenyl radical or an ortho-fused bicyclic carbocyclic radical having about nine to twenty ring atoms in which at least one ring is aromatic. Aryl (Ar) can include substituted aryls, such as a phenyl radical having from 1 to 5 substituents, for example, alkyl, alkoxy, halo, and like substituents.

"Het" includes a four-(4), five-(5), six-(6), or seven-(7) membered saturated or unsaturated heterocyclic ring having 1, 2, 3, or 4 heteroatoms selected from the group consisting of oxy, thio, sulfinyl, sulfonyl, and nitrogen, which ring is optionally fused to a benzene ring. Het also includes "heteroaryl," which encompasses a radical attached via a ring carbon of a monocyclic aromatic ring containing five or six ring atoms consisting of carbon and 1, 2, 3, or 4 heteroatoms each selected from the group consisting of non-peroxide oxy, thio, and N(X) wherein X is absent or is H, O, ($C_{1-4}$)alkyl, phenyl, or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto.

In embodiments, halo or halide includes fluoro, chloro, bromo, or iodo. Alkyl, alkoxy, etc., include both straight and branched groups; but reference to an individual radical such as "propyl" embraces only the straight chain radical, a branched chain isomer such as "isopropyl" being specifically referred to.

The carbon atom content of various hydrocarbon-containing (i.e., hydrocarbyl) moieties can alternatively be indicated by a prefix designating a lower and upper number of carbon atoms in the moiety, i.e., the prefix $C_{i-j}$ indicates a moiety of the integer "i" to the integer "j" carbon atoms, inclusive. Thus, for example, ($C_1$-$C_7$)alkyl or $C_{1-7}$alkyl refers to alkyl of one to seven carbon atoms, inclusive, and hydrocarbyloxy such as ($C_1$-$C_8$)alkoxy or $C_{1-8}$alkoxy refers to alkyl of one to eight carbon atoms, inclusive.

Specifically, $C_{1-7}$alkyl can be methyl, ethyl, propyl, isopropyl, butyl, iso-butyl, sec-butyl, tert-butyl, pentyl, 3-pentyl, hexyl, or heptyl; ($C_{3-12}$)cycloalkyl can be cyclopropyl, cyclobutyl, cyclopentyl, cyclohexyl, cycloheptyl, cyclooctyl, bicyclic, tricyclic, or multi-cyclic substituents.

$C_{1-8}$alkoxy can be methoxy, ethoxy, propoxy, isopropoxy, butoxy, iso-butoxy, sec-butoxy, pentoxy, 3-pentoxy, hexyloxy, 1-methylhexyloxy, heptyloxy, octyloxy, and like substituents.

—C(=O)alkyl or ($C_{2-7}$)alkanoyl can be acetyl, propanoyl, butanoyl, pentanoyl, 4-methylpentanoyl, hexanoyl, or heptanoyl. Aryl (Ar) can be phenyl, naphthyl, anthracenyl, phenanthrenyl, fluorenyl, tetrahydronaphthyl, or indanyl. Het can be pyrrolidinyl, piperidinyl, morpholinyl, thiomorpholinyl, or heteroaryl. Heteroaryl can be furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) or quinolyl (or its N-oxide).

A specific value for Het includes a five-(5), six-(6), or seven-(7) membered saturated or unsaturated ring containing 1, 2, 3, or 4 heteroatoms, for example, non-peroxide oxy, thio, sulfinyl, sulfonyl, and nitrogen; as well as a radical of an ortho-fused bicyclic heterocycle of about eight to twelve ring atoms derived therefrom, particularly a benz-derivative or one derived by fusing a propylene, trimethylene, tetramethylene or another monocyclic Het diradical thereto.

Other conditions suitable for formation and modification of the compounds, oligomers, polymers, composites or like products of the disclosure, from a variety of starting materials or intermediates, as disclosed and illustrated herein are known. For example, see Feiser and Feiser, "Reagents for Organic Synthesis", Vol. 1, et seq., 1967; March, J. "Advanced Organic Chemistry," John Wiley & Sons, 4$^{th}$ ed. 1992; House, H. O., "Modem Synthetic Reactions," 2$^{nd}$ ed., W. A. Benjamin, New York, 1972; and Larock, R. C., "Comprehensive Organic Transformations," 2$^{nd}$ ed., 1999, Wiley-VCH Publishers, New York. The starting materials employed in the preparative methods described herein are, for example, commercially available, have been reported in the scientific literature, or can be prepared from readily available starting materials using procedures known in the field. It may be desirable to optionally use a protecting group during all or portions of the above described or alternative preparative procedures. Such protecting groups and methods for their introduction and removal are known in the art. See Greene, T. W.; Wutz, P. G. M. "Protecting Groups In Organic Synthesis," 2$^{nd}$ ed., 1991, New York, John Wiley & Sons, Inc.

"Include," "includes," or like terms means encompassing but not limited to, that is inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compounds, compositions, composites, concentrates or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, to a sol-gel-polymer composition, to a method of making or using the sol-gel-polymer composition, formulation, or composition, and articles, devices, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, excessive, extended, or unnecessary exposure of the resulting nanocomposite to high heat or high drying temperatures, and like steps.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, initiators, promoters, and like aspects, and ranges thereof, are for illustration only; they do not exclude other defined values or other values within defined ranges. The compositions, apparatus, and methods of the disclosure include those having any value or any combination of the values, specific values, more specific values, and preferred values described herein.

The sol-gel process is an established method for glass preparation that doesn't require high temperatures as with a traditional method of forming inorganic oxide glass, such as $SiO_2$ by melting glass forming compounds at high temperatures, for example, more than 1,400° C. With the sol-gel method the condensation of reactive hydrolyzed metal alkoxides can occur in the liquid phase at temperatures, e.g., from about 25 to about 60° C. The established sol-gel process is a two step process where metal alkoxides are first hydrolyzed to form metal hydroxides then the hydroxides condense to form a three-dimensional network (For additional definitions, descriptions, and methods of silica materials and related metal oxide materials, see for example, R. K. Iler, *The Chemistry of Silica*, Wiley-Interscience, 1979).

Acid or base catalysts may be used for the hydrolysis. By varying the catalysts, significant effects on gelation time, bulk and apparent density, and volume shrinkage on drying can be obtained (see, e.g., Brinker C. J., Scherer G. W. *Sol-gel science*. San Diego: Academic Press; 1990).

Additionally, the sol-gel process through transalcoholysis (transesterification) of different metal alkoxides (Si, Al, etc.) has been described (see, e.g., Brinker C. J., et al., *Sol-gel science*. San Diego: Academic Press; 1990; Doeuff S. et al., *Mater. Res. Bull.* 25, 1519, 1990; Touati F. et al., *J. Sol-Gel Sci. Technol.* 8, 595, 1997; Brandhuber D. et al., *Chem. Mater.* 17, 4262, 2005; Goutille Y. et al., *Polymer,* 44, 3165, 2003; Tangwiwat S. et al., *J. Non-Cryst. Solids,* 351, 976, 2005; Matsui H. et al., *J. Mater. Sci.,* 42, 3694, 2007; Cheng X. Et al., *Eur. Polymer Sci.,* 44, 918, 2008; Rupcich N. Et al., *Chem. Mater.,* 15, 1803, 2003; Eo Y.-J. et al., *J. Mater. Res.,* 20 (2), 401, 2005; Kang E.-S. et al., *J. Mater. Res.,* 21 (5), 1286, 2006; Matsui H. et al., *J. Mater. Sci.,* 41, 2137, 2006; and Tu Y.-L. et al., *J. Am. Ceram. Soc.,* 79 (2), 441, 1996). The reaction of metal alkoxides with a variety of glycols or alcohols at room temperature produces a gel over times ranging, for example, from a few minutes to a few days.

Alcoholysis with ethylene glycol and propane-1,2-diol has been studied by IR and NMR spectroscopy (see, e.g., Doeuff S. et al., *Mater. Res. Bull.* 25, 1519, 1990; Touati F. et al., *J. Sol-Gel Sci. Technol.* 8, 595, 1997; Brandhuber D. et al., *Chem. Mater.* 17, 4262, 2005; Tangwiwat S. et al., *J. Non-Cryst. Solids,* 351, 976, 2005). In particular, it was shown that an exchange reaction between alkoxyl groups of metal alkoxides ($M(OR)_n$) and diol ($HO-R^1-OH$) groups can occur, leading to the hybrid gels. A simplified reaction scheme of this process is represented by the equation:

where ROH is a liquid by-product.

Recently, some procedures were reported for preparation of metal oxides from metal alkoxides without water. One of those procedures is represented by the so-called "nonhydrolytic sol-gel process," which involves the reaction of metal alkoxides and metal halides (see, e.g., Formasieri G. et al., *J. Am. Chem. Soc.*, 127, 4869, 2005).

Inorganic-organic composite materials are increasingly important due to their extraordinary properties which may arise from synergism between their components. There are many possible applications of the materials. The large number of different combinations in nanocomposites between organic and inorganic species permit potential access to physical properties which could not have been obtained by traditional composite materials.

A design challenge of these hybrid organic-inorganic systems is the control of the mixing between the two dissimilar species, which can determine, e.g., the homogeneity of the final product. The formation of interpenetrating networks (IPNs) between organic and inorganic moieties is one possible approach to solve the inhomogeneity problem. The simultaneous synthesis of an LPN can result in a homogeneous material. A major problem during this process arises from the differential stabilities of intermediates and products. While inorganic systems are thermally quite stable and are often formed at high temperature, most organic ingredients have an upper temperature limit of around about 250° C. Therefore, the synthesis of hybrid composite systems requires a strategy wherein the formation of the components is well-suited to each of the components, e.g., the use of a low-temperature formation procedure. For this reason milder reactions have to be applied for the formation of inorganic network. An ideal procedure for the generation of such composite materials is the sol-gel process. The sol-gel method allows composite materials made of inorganic and organic components which would not survive the very high temperatures of traditional glass making methods.

The formation of homogeneous and optically transparent hybrid materials by a bulk-free radical polymerization of 2-hydroxyethyl methacrylate (HEMA) simultaneously with the sol-gel reaction of tetraethoxysilane (TEOS) as precursor is an example in using the advantage of an attracting interaction (see Trabelsi S. et al., *Macromolecules*, 38, 6068, 2005). If the sol-gel network formation is fast enough, a macroscopic phase separation can be avoided. This has been demonstrated by applying a rapid non-aqueous sol-gel process where formic acid was used with silicone alkoxides. In this process water, which is necessary for the condensation of the silicate species, was produced by an esterification reaction of the alcohols and was released by the silica precursor and formic acid. In these systems a TEOS/poly(MMA) hybrid was obtained in about 15 min compared to about 200 hr using conventional systems (see Tu Y.-L. et al., *J. Mater. Res.*, 11 (10), 2556, 1996).

Notwithstanding all the positive aspects of the sol-gel process, it is necessary to consider the main disadvantage, especially for the synthesis of monolithic hybrid composite samples. Once formed, the gelled $SiO_2$ network must be dried, for example, requiring the removal of cosolvent(s) and liberated alcohol, excess water, or a combination thereof. This requisite drying process effectively prevents the practical and reproducible synthesis of monoliths or thick films with dimensions greater than a few millimeters, because these objects tend to shrink, crack, and shatter. Cracking can be minimized in several ways, including, e.g., very slow, controlled drying over the course of weeks or months, by increasing the average pore size through the introduction of, e.g., colloidal silica seed particles, by adding surfactants, by super-critical drying, or by the addition of special reagents. One of the major obstacles to the widespread application of sol-gel techniques is the fact that this drying process is accompanied by extraordinary shrinkage of the solid inorganic phase. Related to the volume fraction of volatiles removed, this shrinkage is routinely on the order about 50-70 weight % (see Grader G. S. et al., *J. Sol-Gel Sci. Technol.*, 21, 157, 2001). The shrinkage on this scale precludes many molding applications and can introduce a high degree of stress in sol-gel monolithic composites. The resulting weight yield of solid product of sol-gel process is typically limited up to about 20-30%. Even in the instance of alcoholysis of metal alkoxides with pure organic acids, without water and cosolvent(s), there are the liquid by-products (e.g., acid esters and water as the polycondensation by-product).

So, shrinkage exists in substantially all sol-gel processes, even for a trans-esterification reaction where an alcohol has to be removed from the final solid product.

Minimizing the shrinkage of the inorganic matrix is particularly important in the fabrication of composites using sol-gel processes, as the shrinkage tends to induce a high degree of stress within the material, particularly if the organic polymer is below its glass transition temperature.

To overcome this problem, Novak has proposed the synthesis of a series of tetraalkoxysilane derivatives possessing polymerizable alkoxide groups in place of the standard ethoxide or methoxide groups, see, e.g., Novak B. M. et al., *Mater. Sci. and Eng.*, A162, 257, 1993, and Novak B. M. *Advan. Mater.*, 5(6), 423, 1993.

The hydrolysis and condensation of these siloxane derivatives liberates a polymerizable alcohol. In the presence of the appropriate catalyst (free radical or ROMP), and by using a stoichiometric amount of water and the corresponding alcohol as cosolvent, all components of these derivatives are polymerized. Since both the cosolvent and the liberated alcohol polymerize, the gel drying process is much shorter and product shrinkage is minimized.

Some significant disadvantages of this approach include, for example: synthesis of metal alkoxides containing the polymerizable groups that may require non-commercial reagents; and incomplete avoidance of the shrinkage effect as the by-product of the polycondensation process (i.e., water) needs to be removed from the final solid product by drying.

Also, it is known that primary alcohols can react with anhydrides of organic acids at mild conditions forming esters (see Sharp, K. G., "A new route to polymer filled glass. Hybrid interpenetrating networks with appreciable toughness," *ACS Symp. Ser.*, 585, 163-180, 1995). If an anhydride of an unsaturated organic acid (i.e., an unsaturated anhydride) such as the methacrylic acid, is selected (i.e., methacrylic anhydride), a reaction product can be an unsaturated ester (i.e., a polymerizable monomer) that can participate in a polymerization process.

In embodiments of the disclosure, the problems of drying and shrinkage-effect in sol-gel preparative processes can be solved by selecting reactants which do not require added solvent and which reactants produce intermediate products which can consume or incorporate any liquid by-products into the final product.

We have surprisingly discovered that a highly efficient process for preparing low-or non-shrinking sol-gel-polymer nanocomposites.

In embodiments, the disclosure provides compositions and methods for making low shrinkage or completely non-shrinking material comprised of an inorganic metal oxide matrix having an interpenetrating network of an organic polymer. In embodiments, the disclosure provides a one-pot sol-gel method for forming a sol-gel-polymer material comprising a non-shrinkable organic-inorganic nanocomposite material having high solid product yields (e.g., >90%). Starting materials, intermediates, organic-inorganic nanocomposite products, and method for making the nanocomposite are disclosed. The method of making the nanocomposite generally involves the following. A metal alkoxide is alcoholyzed in a mixture of a glycol (diol), reactive alcohol, or both, to form a transparent solution. Next an anhydride of an unsaturated organic acid (i.e., unsaturated anhydride) is added to the mixture to form a gel and to concurrently polymerize the main by-product of a second alcoholysis reaction; the unsaturated alkyl esters formed from the anhydride, i.e., the monomers. The resulting organic-inorganic nanocomposite material comprises a network of inorganic oxides having inter-penetrating chains of the in situ polymerized monomer, such as an acrylate polymer formed for unsaturated esters.

The starting reactants can include, for example, a metal (M) alkoxide, where M is, e.g., Si, Al, Ti, Zn, and like metals, or mixtures thereof, and a glycol, such as ethylene glycol, propane-1,2-diol, and like glycols or polyglycols (such as polyethylene glycol, polypropylene glycol, and like polyglycols), and an anhydride of an unsaturated organic acid, such as methacrylic anhydride, a cross-linking agent, such as an acrylic, methacrylic, or like esters of mono-diethylene glycol or divinylbenzene, and a free radical polymerization initiator or agent, such as AIBN, benzoyl peroxide, dicumyl peroxide, and like initiators, or actinic radiation.

The alcoholysis of metal alkoxides provides metal hydroxides, which are the precursors of an inorganic network. Simultaneously, the alcohol by-product of the metal alkoxide alcoholysis or glycolysis, reacts with an anhydride of unsaturated acid (i.e., unsaturated anhydride) forming an unsaturated ester, which is polymerized with a cross-linking agent. The cross-linking agent can be present in an amount of, for example, from about 0.001 to about 5 weight % based on the weight of the added unsaturated anhydride or its corresponding in situ generated unsaturated diester monomer.

The simultaneous operation of two reaction processes, i.e., a sol-gel formation by alcoholysis manifold, and free radical polymerization manifold, having alcoholysis by-product participation and conversion into the organic polymer manifold, provides a solid inorganic network which is intimately interwoven on a molecular level with a cross-linked interpenetrating network of polymer chains.

Advantages of present disclosure, in embodiments include, for example:

Low cost nanocomposite materials from relatively low cost starting materials.

Reduced energy costs afforded by low reaction temperatures and avoiding lengthy separation or removal of a liquid by-product (i.e., alcohol).

The alcoholysis or glycolysis reaction does not require any external catalyst or solvent addition.

Yields of the final solid product can be excellent (e.g., >90%).

Cracking or substantial shrinkage of the final product are absent.

The product can be formed as a consolidated monolithic substrate without dimensional or form limitations due to the absence of any substantial liquid by-product.

The structure and composition of nanocomposite material can be readily varied within a broad range because many different metal alkoxides and many different organic monomers can be selected for use in the process.

In embodiments, the disclosure provides a solvent-less method of making an organic-inorganic nanocomposite comprising, for example:

reacting a mixture comprised of a metal alkoxide of the formula $R_xM(OR^1)_{4-x}$, or of the formula $R_xM(OR^1)_{m-x}$, as defined herein, and a diol of the formula $HO-R^2-OH$, to form an intermediate reaction product comprised of an inorganic metal oxide matrix and a liquid alcohol by-product; and adding an unsaturated anhydride to the resulting reaction mixture to take-up the alcohol by-product and form an unsaturated ester, the unsaturated ester simultaneously polymerizes to foam a end product comprised of a nanocomposite having interpenetrating networks of inorganic and organic components.

Consumption of the alcohol generated in the formation of the metal oxide matrix with an esterification component comprises reacting the alcohol with, for example, an esterification component, such as unsaturated anhydride. The reaction of the alcohol with the esterification component comprises alcoholysing at least one unsaturated anhydride with the alcohol. The polymer formed from the reaction mixture comprises polymerizing the products of the reaction of an alcohol (by-product) with the unsaturated anhydride.

The inorganic metal oxide matrix formed by the reaction of the metal alkoxide of the formula $R_xM(OR^1)_{m-x}$, and the diol of the formula $HO-R^2-OH$, as defined herein, comprises alcoholysing with the diol (i.e., glycolysing) the metal alkoxide to form an inorganic oxide matrix of the formula:

$$-[-O-M-O-R^2-]_p-$$

where M is a metal, and p is a number of repeat units of at least, for example, about 2 or more. In embodiments, the number of repeat units p can be, for example, several hundred to several thousand or more.

The inorganic metal oxide matrix resulting from the reaction mixture of the metal alkoxide and the alcohol of the formula $HO-R^3$ comprises accomplishing alcoholysis of the metal alkoxide to form the inorganic oxide matrix of the formula:

$$-M-[O-R^3]_q-$$

where M is a metal and q can be from 2 to about 500.

In embodiments, the disclosure provides a method for making a composite comprising:

a first reacting, such as with mild heating, of a mixture comprised of:

i) a metal alkoxide of the formula $R_xM(OR^1)_{m-x}$, where

M is Si, Ti, Ta, Sn, Al, Zr, Hf, or a combination thereof,

R, if present, is a hydrocarbyl group having from 1 to about 10 carbon atoms, or an unsaturated hydrocarbyl group having from 1 to about 10 carbon atoms, for example, allyl, -alkoxy, -acryl, -methacryl, -alkenyl, -cycloalkyl, -heterocyclic, -aryl, -heteroaryl, -alkylene-cycloalkyl, -cycloalkylene-alkyl, -alkylene-aryl, -allylene-heteroaryl, -arylene-alkyl, -heteroarylen-alkyl, -alkylene-acryl, alkylene-methacryl, or mixtures thereof, $OR^1$ is each independently an alcoholysable hydrocarbyloxy group, also known as an alkoxy group, having from 1 to about 10 carbon atoms, x is 0 to 5, and m is 1 to 5, and ii) a diol of the formula $HO-R^2-OH$, or an alcohol of the formula $HO-R^3$, where $R^2$ is a divalent hydrocarbylene group, also known as an alkyl group, having from 1 to about 10 carbon atoms, or polymeric chains incorporating a plurality of alkoxyl groups, for example, polyethers such as a polyalkylene glycol, urethane groups, carbonate groups, or a combination thereof, see for example, working examples 4, 5, 8 and 9 herein;

$R^3$ is a polymerizable monovalent unsaturated hydrocarbyl group having from 3 to about 18 carbon atoms, for example, alkyl-acryl, alkyl-methacryl, alkyl-vinyl and alkyl-aryl-vinyl such as a polymerizable hydroxy substituted olefin 2-hydroxyethyl acrylate (HEA), 2-hydroxyethyl methacrylate(HEMA);

or a mixture of a diol of the formula HO—$R^2$—OH and an alcohol of the formula HO—$R^3$; and a second reacting, such as heating, of a mixture comprising the resulting product of the first reacting and a mixture comprised of an organic polymer precursor, such as the unsaturated anhydride, a cross-linker, and a free-radical initiator.

The first reacting can be accomplished, for example, with heating at from about 50 to about 150 degrees C., for about 0.5 to about 5 hours.

The second reacting can be accomplished, for example, with heating at an increasing temperature, such as in a gradient or in one or more steps, of from about 45 to about 150 degrees C., over a period of for about 20 to about 100 hours.

The metal alkoxide can comprise, for example, at least one of a 3-(trimethoxysilylpropyl)methacrylate (TMSPM), tetraethoxysilane (TEOS), triethoxyvinylsilane (TEVS), styrylethyltrimethoxysilane (SEMS), tetramethoxysilane (TMOS), titanium ethoxide (TEO), titanium isopropoxide (TIP), aluminum triethoxide (ATO), aluminum tributoxide (ATB), tin tert-butoxide (TTB), hafnium butoxide (HAB), tantalum ethoxide (TAE), aluminum isopropoxide (AIPO), zirconium ethoxide (ZEO), zirconium propoxide (ZIP), and like metal alkoxides, or a combination thereof.

The diol can be, for example, at least one of ethylene glycol, polyethylene glycol, 1,2-propylene glycol, polypropylene glycol), a bisphenol, an alkoxylated phenol such as an ethoxylated phenol, a polyurethane diol, a polycarbonate, an alkoxylated bisphenol diol, a polyurethane diol, a polycarbonate diol, and like diol compounds, or a combination thereof.

The alcohol can be, for example, at least one free radical reactive hydroxy containing acrylate monomer such as 2-hydroxyethyl acrylate (HEA), 2-hydroxyethyl methacrylate (HEMA), or a combination thereof.

The unsaturated anhydride can be, for example, the anhydride of at least one unsaturated acid selected from an acrylic acid, an alkyl acrylic acid such as methacrylic acid, crotonic acid (3-methylacrylic acid), itaconic acid (2-methylidenebutanedioic acid), and like unsaturated anhydrides, maleic acid, and like cyclic unsaturated anhydrides, or a combination thereof. A preferred mole ratio between the metal alkoxide and the anhydride is, e.g., from about 1:1 to about 1:2, which is enough for the complete consumption of all alcohol molecules generated in the alcoholysis or glycolysis reaction of the metal alkoxide.

The cross-linker or cross-linking agent can be, for example, at least one of a dialkylene glycol diacrylate such as (ethylene glycol)$_n$-dimethacrylate or -diacrylate or a divinyl ester, where n is from 1 to 4, a trimethylolpropane ethoxylate triacrylate having (available from Sigma-Aldrich), e.g., 1 E O:OH, 7:3 EO:OH, and like levels of ethoxylation, bisphenol A ethoxylate (e.g.: 2 EO/phenol) diacrylate or dimethacrylate, divinyl benzene, and like cross-linkers, or combination thereof. Preferred molar percentages of the cross-linking reagent relative to the content of the unsaturated monomer can be from about 0.1% to about 10%. A preferred cross-linker family is, for example, trimethylolpropane ethoxylate triacrylate cross-linkers, of the formula:

available from Sigma-Aldrich, for example, trimethylolpropane ethoxylate (14/3=EO/OH) triacrylate, trimethylolpropane ethoxylate (7/3=EO/OH) triacrylate having an average $M_n$ of about 912, and like cross-linkers, or a combination thereof.

The free-radical initiator can be, for example, at least one of a thermo-polymerization initiator, a photo-polymerization initiator, or a combination thereof, such as an azo-compound (e.g.: azobisisobutyronitrile, AIBN), organic peroxides (e.g.: benzoyl peroxide, dicumyl peroxide) and like initiators. Preferred amounts of the initiator can be, for example, from about 0.1 to about 0.5% by weight relative to the monomer, and sufficient actinic radiation, and like polymerization initiators.

The first reacting and second reacting can be accomplished, for example, free of any added solvent or diluent. In embodiments, the method can be accomplished in a single vessel, that is, a single-pot.

With regard to controllably forming products having, for example, desired optical properties, if tetraethoxysilane (TEOS) is selected as the metal alkoxide in combination with a glycol or if tetraethoxysilane (TEOS) is selected as the metal alkoxide in combination with hydroxyethyl methacrylate (HEMA), hydroxyethyl acrylate (BEA), or both acrylates, then a non-transparent or translucent monolithic product is obtained. Additionally, with regard to forming products having desired optical properties, if trimethoxysilyl propylmethacrylate is selected as the metal alkoxide in combination with a glycol or in combination with hydroxyethyl methacrylate(BEMA), hydroxyethyl acrylate (BEA), or both acrylates, then a transparent monolithic product is obtained.

In embodiment, the resulting organic-inorganic nanocomposite can be, for example, a non-meltable, homogeneous solid. Many of the nanocomposites of the disclosure may have decomposition points at or near their melting points. In embodiments, the mass yield of the resulting organic-inorganic nanocomposite can be, for example, from about 90% to about 98%, or greater yields.

In embodiments, the second reacting, such as with mild heating, can be accomplished, for example, until the solid product has a constant weight, i.e., free of any significant weight change.

The reaction mixture can have a volume contraction during the preparative process of less than about 10%. The final solid product can have a volume shrinkage on drying of, for example, less than about 10%.

In embodiments, the preparative method can have an intermediate reaction mixture which can further comprise the external addition of at least one additional polymerizable organic monomer, of at least one additional polymerizable oligomeric compound, or a combination thereof.

In embodiments, the disclosure provides a sol-gel-polymer nanocomposite having interpenetrating networks comprising:
a sol-gel inorganic polymer network; and
a cross-linked organic polymer network,
the cross-linked organic polymer network having at least one covalent bond to the sol-gel inorganic polymer network.

In embodiments, the nanocomposite of the disclosure can contain, for example, from about 10 to about 90 wt % sol-gel inorganic polymer; and from about 90 to about 10 wt % of the cross-linked organic polymer based on the total weight of the nanocomposite. In embodiments, the at least one covalent bond to the sol-gel inorganic polymer can be, for example, a plurality of bonds to the sol-gel inorganic polymer. The extent of covalent attachment between the inorganic polymer network and the organic polymer network can be selected, such as by selection of cross-linker and reactants, to render the networks in the resulting nanocomposite essentially inseparable by physical means. The sol-gel-polymer composite having interpenetrating networks of the disclosure is not believed to have any substantial or observable macroscopic surface boundary between the organic and inorganic components, see for example, FIGS. 2 and 3.

In embodiments, the disclosure provides a sol-gel-polymer nanocomposite comprising combining the respective products of:
a first reaction comprising a mixture comprised of a metal alkoxide and at least one of a diol, an alcohol, or a combination thereof; and
a second reaction comprising the product of the first reaction and a mixture comprised of an unsaturated anhydride, a cross-linker, and a free-radical initiator. The sol-gel-polymer nanocomposite prepared by the above process can further include, if desired or if necessary, drying the product of the second reaction until the solid has a constant weight and volume.

In embodiments, the disclosure provides a nanocomposite composition and articles thereof prepared by any of the above mentioned processes.

In embodiments, the disclosure relates to a method for producing a non-shrinking composite material comprised of organic polymers in an inorganic oxide matrix where both the organic and inorganic phases are covalently bonded.

The starting mixture of reagents can be selected so that the product composite does not substantially shrink during the entire process including the drying procedure with the exception of a small shrinkage of the system of less than about 10% due to the contraction of the polymeric phase in the course of the organic monomer polymerization.

In embodiments, the preparative method of the disclosure can include, for example, forming a mixture of the following:
a metal alkoxide of the formula $R_xM(OR^1)_{4-x}$,
where M is Si, Ti, Al, Zr, or combination thereof,
R is a saturated or unsaturated hydrocarbyl group,
$OR^1$ is a hydrolyzable hydrocarbyloxy or alkoxy group with a molecular weight of less than about 200, and
x is 0 to 3; and
a glycol;
followed by the addition of a second mixture of:
an unsaturated anhydride;
a cross-linking reagent; and
a free radical initiator.

In embodiments, the reaction mixture can be prepared in two steps. First, a metal alkoxide and the glycol or alcohol can be mixed with heating to give a transparent homogeneous solution. Next, the polymerizable monomer is added and the mixture is heated to complete the anhydride transesterification reaction and the monomer polymerization.

The resulting solid nanocomposite product does not contain, or is free-of, any liquid by-products and thus avoids having any product shrinkage attributable to liquid removal or evaporation.

Figure 1:
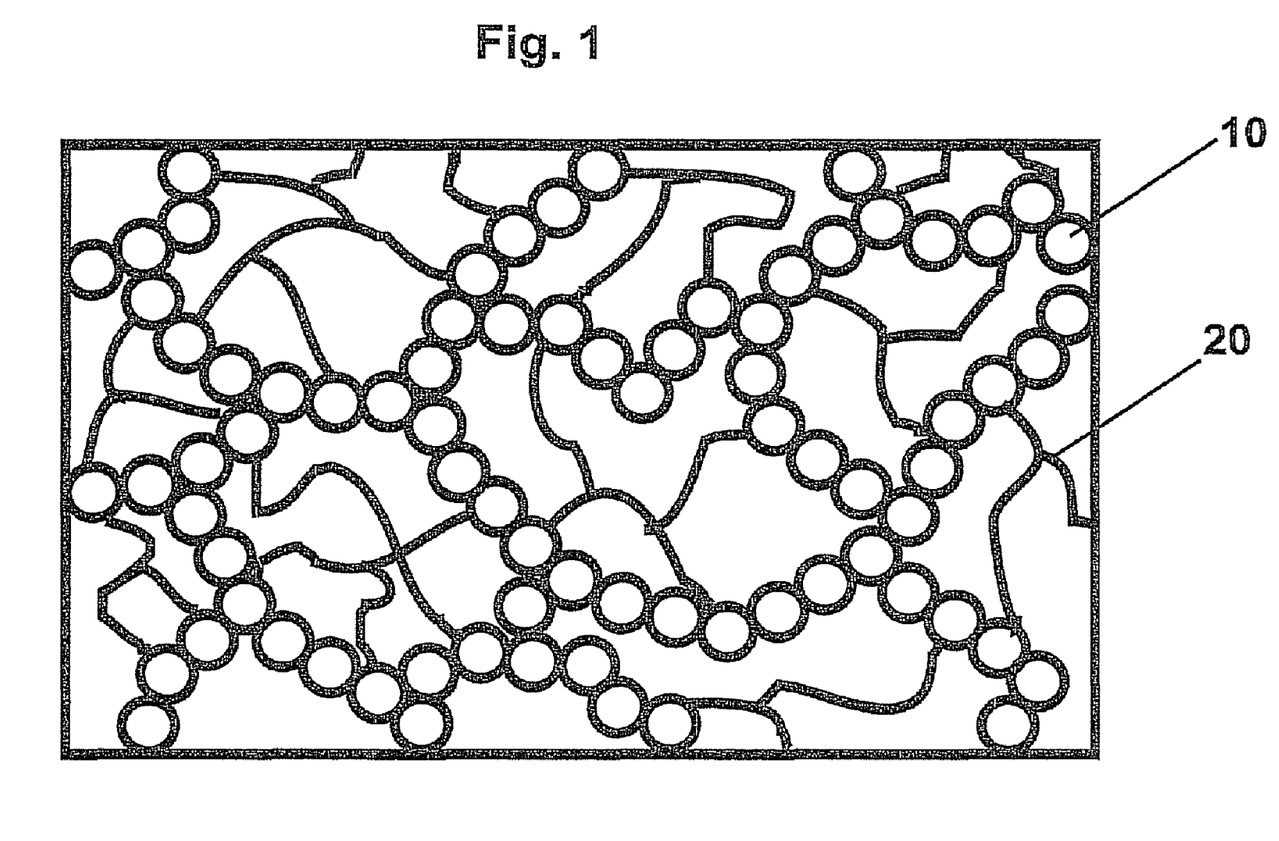
FIG. 1 schematically shows a nanocomposite comprised of a sol-gel inorganic polymer network, and a cross-linked interpenetrating organic polymer network, in embodiments of the disclosure.

Referring to the Figures, FIG. 1 schematically shows a nanocomposite comprised of a sol-gel inorganic polymer network as interconnected spheres (10), and a cross-linked organic polymer network as interconnected solid lines (20).

Figure 2:
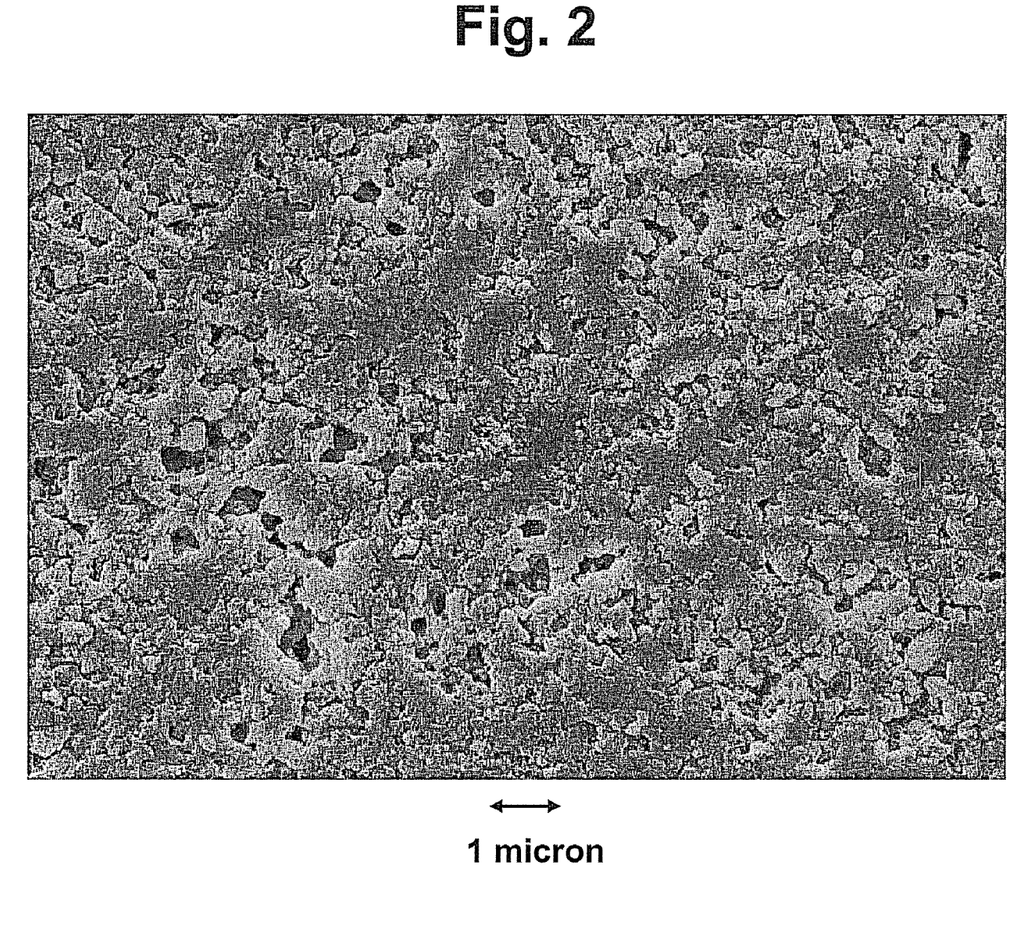
FIG. 2 shows a low magnification SEM image of a polished section of nanocomposite sample of Example 1, in embodiments of the disclosure.
Figure 3:
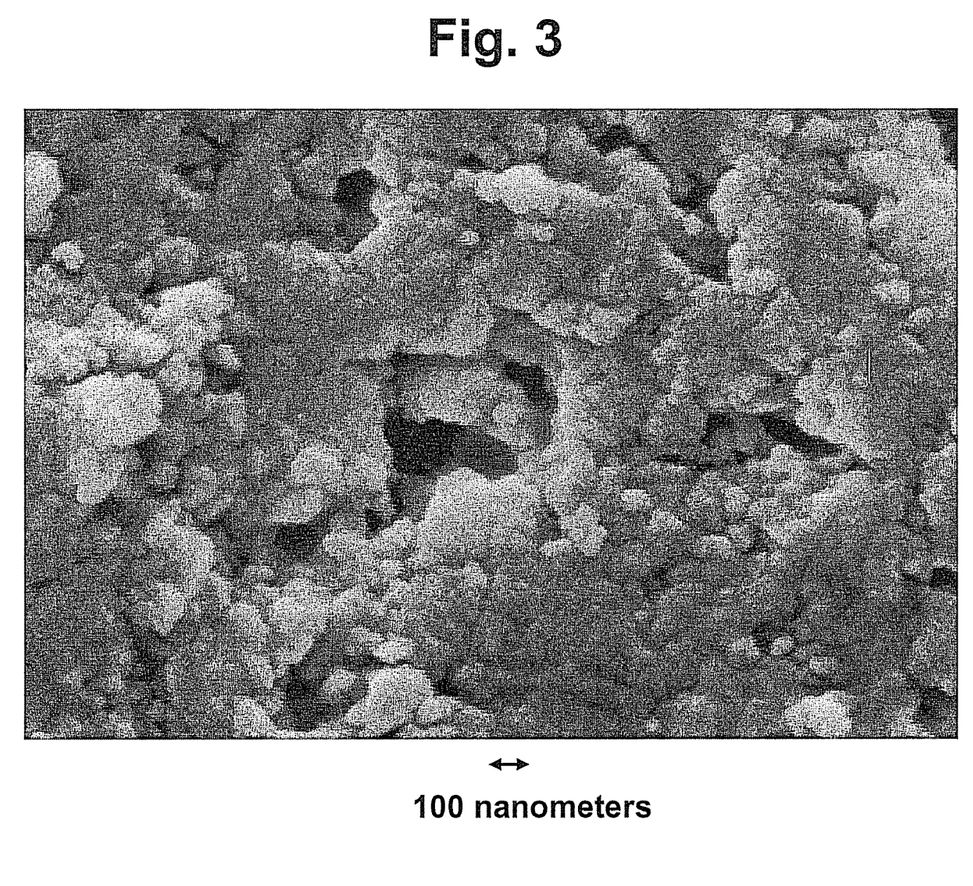
FIG. 3 shows a high magnification SEM image of the polished section of nanocomposite sample of Example 1, in embodiments of the disclosure.

FIGS. 2 and 3 show SEM images at low (1 micron scale) and high (100 nanometer scale) magnification of polished sections of nanocomposite samples of Example I. In contrast, low (1 micron scale) and high (100 nanometer scale) magnification SEM images (not shown) of polished sections of nanocomposite samples of Example 7 provided no indication of sample inhomogenitity.

EXAMPLES

The following examples serve to more fully describe the manner of using the above-described disclosure, as well as to set forth the best modes contemplated for carrying out various aspects of the disclosure. It is understood that these examples in no way limit the scope of this disclosure, but rather are presented for illustrative purposes. The working examples further describe how to prepare the nanocomposites of the disclosure.

Test Methods
A. Structure/Homogeneity; SEM/AED Samples were analyzed with a Jeol SEM, AED was accomplished with an AED Noran analyzer connected with the Jeol instrument. The probes were metallized with nickel (8 nm). The topographic contrast was 4 kV.
Density Density of each composite sample was measured by the conventional Archimedean method. The sample weight in air and in deionized water was measured using a digital scale to the accuracy 0.0001 gram. The volume of each sample was determined. The final density was computed from the sample weight and volume.
B. Thermal/mechanical Properties; DSC DSC was conducted on the composite samples using a DSC PYRUS from Perkin Elmer. The following scan conditions were employed with nitrogen flow (20 mL/min).
Temperature Ramp: 10° K(Kelvin)/min from 30° C. to 600° C.
20° K./min from 30° C. to 600° C.
TGA TGA was conducted on the composite samples using an STA 409C instrument Netzsch. All of the samples were analyzed under an inert atmosphere having a 100 mL/min nitrogen purge. The samples were heated from 20° C. to 600° C. at 5° K/min. A two-point Curie Point Temperature Calibration with nickel and perkalloy were performed to verify the accuracy of the TGA system.
TMA Specimens were cut from flat sheets and scanned in the TMA TA Instruments Model Q400 from 20° C. to 200° C. at 5° C./min.
CTE Measurement The coefficient of thermal expansion (CTE) was measured by the TMA method. Specimens were cut from flat sheets and scanned in the TMA TA Instruments Model Q400 from 20° C. to 200° C. at 5° C./min although the direction of the method was perpendicular to the surface of the sample (X-Y), i.e., along Z-direction. The CTE was considered as a property for the entire bulk sample because of its uniform isotropic nature.
Inorganic Content Analysis A portion of the composite sample (1-1.5 g) was weighted and heated in oven at 600° C. for about 3 to about 4 hours in air. The inorganic content was calculated by weight difference after heating.

Example 1

The inner surface of an ampoule was previously hydrophobized by treatment with a solution of dichlorodimethylsilane (DCDMS) in dry decane. A transparent solution was prepared from a mixture of 6.2591 g (0.03 mole) tetraethoxysilane (TEOS) and 1.9246 g (0.031 mole) of ethylene glycol (EG) by heating at 150° C. for 2 h. Then 0.0816 g of benzoyl peroxide (BP), 0.0496 g of dicumyl peroxide (DCP), 2.4556 g (0.0101 mole) of diethylene glycol dimethacrylate (DMDEG) and 6.9735 g (0.0452 mole) of methacrylic acid anhydride (MAAN) were added to the glass ampoule and sealed in air (mole ratios: TEOS:EG=1:1.03; TEOS:MAAN=1:1.51). After stirring the reaction mixture for 30 min at about 25° C., the transparent solution was heated in an oven according to Table 1.

TABLE 1

| Temp (° C.) | Time (h) |
|---|---|
| 60 | 20 |
| 80 | 3 |
| 100 | 6 |
| 120 | 15 |
| 150 | 4 |

The yield of the solid white non-transparent nanocomposite solid product was 95.0 wt %. The SEM/AED observations of polished sections of the sample surface showed structural homogeneity at the nano scale. No separate particles or different phase contrast was observed (see FIG. 2). But the AED spectrum showed the presence of Si after sample heating at 600° C. (suggesting the presence of $SiO_2$ particles).

Physical properties of the sol-gel-polymer composite measured according to the mentioned test methods are provided in Table 2.

TABLE 2

Physical properties of the sol-gel-polymer composite of Example 1.

| | | TGA/DSC data | | | Amount of |
|---|---|---|---|---|---|
| d (g/cm$^3$) | CTE (25-90° C.) | Start of degradation | Loss of mass between 30 and 180° C. | Residual mass @ 600° C. | inorganic moiety ($SiO_2$) |
| 1.353 | 49 ppm/° C.$^{-1}$ | about 200° C. | −7.60% | 12.90% | 10.02% |

(TEOS) and 0.8565 g (0.0138 mole) of ethylene glycol (EG) by heating at 150° C. for 3 h. Then 0.0200 g of benzoyl peroxide (BP) and 2.7017 g (0.0175 mole) of methacrylic acid anhydride (MAAN) were added to the glass ampoule and sealed in air (mole ratios: TEOS:EG=1:1.99; TEOS:MAAN=1:2.52). After stirring the reaction mixture for about 30 min at ambient temperature, the transparent solution was heated in an oven according to the schedule of Table 3.

TABLE 3

| Temp (° C.) | Time (h) |
|---|---|
| 50 | 16 |
| 60 | 8.5 |
| 80 | 16 |
| 100 | 9 |
| 120 | 15 |
| 135 | 2 |

The yield of the opaque nanocomposite solid product was 97.3%. Physical properties of the sol-gel-polymer composite product are provided in Table 4.

TABLE 4

Physical properties of sol-gel-polymer composite of Example 2.

| | | TGA/DSC data | | | Amount of |
|---|---|---|---|---|---|
| D(g/cm$^3$) | CTE (25-90° C.) | Start of degradation | Loss of mass between 25 and 200° C. | Residual mass @ 600° C. | inorganic moiety ($SiO_2$) |
| 1.240 | 129 ppm/° C.$^{-1}$ | about 250° C. | −11.20% | 10.90% | 6.10% |

Example 2

The inner surface of an ampoule was hydrophobized by treatment with a solution of dichlorodimethylsilane (DCDMS) in dry decane. A transparent solution was prepared from a mixture of 1.4450 g (6.9 mmol) of tetraethoxysilane Example 3

The inner surface of an ampoule was hydrophobized with a solution of dichlorodimethylsilane (DCDMS) in dry decane. A transparent solution was prepared from the mixture of 1.3577 g (6.5 mmol) of tetraethoxysilane (TEOS) and 0.9544 g (0.0125 mole) 1,2-propylene glycol (PG) by heating at 100° C. for 3 h. Then 0.0161 g of benzoyl peroxide (BP), 2.6526 g (0.0172 mole) of methacrylic acid anhydride (MAAN) and 0.0990 g (0.5 mmol) of diethylene glycol diacrylate (DADEG) were added to the glass ampoule and sealed in air (mole ratios: TEOS:PG=1:1.92; TEOS:MAAN=1:2.64). After stirring the reaction mixture for about 30 min at ambient temperature, the transparent solution was heated in an oven according to Table 5.

TABLE 5

| Temp (° C.) | Time (h) |
|---|---|
| 50 | 16 |
| 60 | 8.5 |
| 80 | 16 |
| 100 | 9 |
| 120 | 15 |
| 135 | 2 |

The yield of the opaque nanocomposite solid product was about 97.5 wt %.
Physical properties of the sol-gel-polymer composite are provided in Table 6.

TABLE 6

Physical properties of the sol-gel-polymer composite of Example 3.

| d (g/cm$^3$) | CTE (25-90° C.) | TGA/DSC data | | | Amount of inorganic moiety (SiO$_2$) |
|---|---|---|---|---|---|
| | | Start of degradation | Loss of mass between 25 and 200° C. | Residual mass @ 600° C. | |
| 1.205 | 131 ppm/° C.$^{-1}$ | about 250° C. | −12.40% | 10.20% | 5.28% |

TABLE 7

| Temp (° C.) | Time (h) |
|---|---|
| 45 | 24 |
| 50 | 14 |
| 60 | 8.5 |
| 80 | 18 |
| 100 | 20 |
| 120 | 15 |
| 135 | 2 |

The yield of the semi-translucent nanocomposite solid product was 90.8%. Physical properties of the sol-gel-polymer nanocomposite are provided in Table 8.

TABLE 8

Physical properties of the sol-gel-polymer composite of Example 4.

| d (g/cm$^3$) | CTE (25-90° C.) | TGA/DSC data | | | Amount of inorganic moiety (SiO$_2$) |
|---|---|---|---|---|---|
| | | Start of degradation | Loss of mass between 25 and 200° C. | Residual mass @ 600° C. | |
| 1.22 | 167 ppm/° C.$^{-1}$ | 175° C. | — | 3.70% | 4.20% |

Example 4

The inner surface of an ampoule was hydrophobized by treatment with a solution of dichlorodimethylsilane (DCDMS) in dry decane. A transparent solution was prepared from the mixture of 1.1736 g (5.6 mmol) tetraethoxysilane (TEOS) and 5.0896 g of polyethylene glycol (PEG from Loba Chemie, MW 600) by heating at 125° C. for about 4 h. Then 0.0348 g of benzoyl peroxide (BP), 0.0105 g of dicumyl peroxide (DCP), 1.6822 g (0.0109 mole) methacrylic acid anhydride (MAAN) and 0.3871 g (1.8 mmol) diethylene glycol diacrylate (DADEG) were added to a glass ampoule and sealed in air (mole ratios: TEOS:PEG=1:1.50; TEOS:MAAN=1:2.0). After stirring the reaction mixture for about 30 min at ambient temperature, the transparent solution was heated in an oven according to Table 7.

Example 5

The inner surface of an ampoule was hydrophobized with a solution of dichlorodimethylsilane (DCDMS) in dry decane. A transparent solution was prepared from a mixture of 2.0305 g (09.7 mmol) of tetraethoxysilane (TEOS) and of 2.9408 g of polypropylene glycol (PPG from Ferak Berlin having 80% MW 150 and 20% MW 425) with heating at 125° C. for about 4 h. Then 0.0607 g of benzoyl peroxide (BP), 0.0180 g of dicumyl peroxide (DCP), 3.0282 g (0.0196 mole) of methacrylic acid anhydride (MAAN) and 0.6738 g (3.1 mmol) of diethylene glycol diacrylate (DADEG) were added to the glass ampoule and sealed in air (mole ratios: TEOS:PPG=1:1.51; TEOS:MAAN=1:2.01). After stirring the reaction mixture for about 30 min at ambient temperature, the transparent solution was heated in an oven according to Table 9.

TABLE 9

| Temp (° C.) | Time (h) |
|---|---|
| 45 | 24 |
| 50 | 14 |
| 60 | 8.5 |
| 80 | 18 |
| 100 | 20 |
| 120 | 15 |
| 135 | 2 |

The yield of the translucent nanocomposite solid product was 91.0 wt %. Physical properties of the sol-gel-polymer composite are provided in Table 10.

TABLE 10

Physical properties of the sol-gel-polymer composite of Example 5.

| d (g/cm$^3$) | CTE (25-90° C.) | TGA/DSC data | | | Amount of inorganic moiety (SiO$_2$) |
|---|---|---|---|---|---|
| | | Start of degradation | Loss of mass between 25 and 200° C. | Residual mass @ 600° C. | |
| 1.20 | 177 ppm/° C.$^{-1}$ | 156° C. | — | 8.10% | 7.20% |

Example 6

The inner surfaces of an ampoule were hydrophobized with a solution of dichlorodimethylsilane (DCDMS) in dry decane. A transparent solution was prepared from the mixture of 2.0867 g (8.4m mole) of 3-(trimethoxysilylpropyl)methacrylate (TMSPM), 0.6608 g (0.0086 mole) 1,2-propylene glycol (PG) by heating at 100° C. for about 1 h. Then 0.0101 g of benzoyl peroxide (BP) and 1.9460 g (0.0126 mole) of methacrylic acid anhydride (MAAN) were added to the glass ampoule and sealed in air (mole ratios: TMSPM:PG=1:1.02; TMSPM:MAAN=1:1.50). After stirring the reaction mixture for about 30 min at ambient temperature, the solution was heated in an oven according to Table 11.

TABLE 11

| Temp (° C.) | Time (h) |
|---|---|
| 60 | 20 |
| 80 | 9 |
| 10 | 14 |
| 120 | 24 |
| 150 | 3 |

The yield of the transparent nanocomposite solid product was 98.6%. Physical properties of the sol-gel-polymer composite are provided in Table 12.

TABLE 12

Physical properties of the sol-gel-polymer composite of Example 6.

| d (g/cm$^3$) | CTE (25-90° C.) | TGA/DSC data | | | Amount of inorganic moiety (SiO$_2$) |
|---|---|---|---|---|---|
| | | Start of degradation | Loss of mass between 30 and 180° C. | Residual mass @ 600° C. | |
| 1.276 | 78 ppm/° C.$^{-1}$ | about 290° C. | −6.80% | 16.40% | 10.80% |

Example 7

The inner surfaces of an ampoule were hydrophobized with a solution of dichlorodimethylsilane (DCDMS) in dry decane. A transparent solution was prepared from the mixture of 3.2112 g (0.0129 mole) 3-(trimethoxysilylpropyl)methacrylate (TMSPM) and 0.8296 g (0.0134 mole) ethylene glycol (EG), and heating at 100° C. during 2.5 h. Then 0.0385 g benzoyl peroxide (BP), 0.7688 g (0.0036 mole) diethylene glycol diacrylate (DADEG) and 3.9329 g (0.0255 mole) methacrylic acid anhydride (MAAN) were added to the glass ampoule and sealed in air (mole ratios: TMSPM:EG=1:1.03; TMSPM:MAAN=1:1.97). After stirring the reaction mixture for 30 min. at ambient temperature, the solution was heated in an oven according to Table 13.

TABLE 13

| Temp (° C.) | Time (h) |
|---|---|
| 50 | 10 |
| 55 | 5 |
| 60 | 20 |
| 80 | 15 |
| 100 | 4 |
| 120 | 20 |
| 150 | 2 |

The yield of the transparent nanocomposite solid product was about 96%. The SEM/AED observations of polished sections of sample surface showed structural homogeneity at the nano-scale. No separate particles or different phase contrast were found by a comparative SEM (images not shown), and lacked any apparent structural detail. However, the AED spectrum showed the presence of Si atoms after heating an analytical sample at 600° C. Physical properties of the sol-gel-polymer composite are provided in Table 14.

TABLE 14

Physical properties of sol-gel-polymer composite of Example 7.

| d (g/cm$^3$) | CTE (25-90° C.) | TGA/DSC data | | | Amount of inorganic moiety (SiO$_2$) |
|---|---|---|---|---|---|
| | | Start of degradation | Loss of mass between 30 and 200° C. | Residual mass @ 600° C. | |
| — | 142 ppm/° C.$^{-1}$ | 315° C. | −7.80% | 14.40% | 9.00% |

Example 8

The inner surfaces of an ampoule were hydrophobized with a solution of dichlorodimethylsilane (DCDMS) in dry decane. A transparent solution was prepared from a mixture of 2.3233 g (9.3 mmol) of 3-(trimethoxysilylpropyl)methacrylate (TMSPM), 2.8172 g of polypropylene glycol (PPG from Ferak Berlin having 80% MW 150 and 20% MW 425) and heating at 100° C. for 1.5 h. Then 0.0405 g of benzoyl peroxide (BP), 0.0253 g of dicumyl peroxide (DCP) and 2.9074 g (0.0188 mole) of methacrylic acid anhydride (MAAN) were added to the glass ampoule and sealed in air (mole ratios: TMSPM:PPG=1:1.51; TMSPM:MAAN=1:2.02). After stirring the reaction mixture for about 30 min at ambient temperature, the solution was heated in an oven according to Table 15.

TABLE 15

| Temp (° C.) | Time (h) |
|---|---|
| 45-48 | 20 |
| 50 | 4 |
| 55 | 6 |
| 60 | 20 |
| 80 | 15 |
| 100 | 4 |
| 120 | 12 |
| 150 | 3 |

The yield of the transparent nanocomposite solid product was 98.3%. Physical properties of the sol-gel-polymer composite are provided in Table 16.

TABLE 16

Physical properties of sol-gel-polymer composite of Example 8.

| d (g/cm$^3$) | CTE (25-90° C.) | TGA/DSC data | | | Amount of inorganic moiety (SiO$_2$) |
|---|---|---|---|---|---|
| | | Start of degradation | Loss of mass between 30 and 200° C. | Residual mass @ 600° C. | |
| 1.19 | 150 ppm/° C.$^{-1}$ | 214° C. | — | 8.40% | 7.20 |

Example 9

The inner walls of an ampoule were hydrophobized by treatment with a solution of dichlorodimethylsilane (DCDMS) in dry decane. A transparent solution was prepared from the mixture of 2.0832 g (8.4 mmol) of 3-(trimethoxysilylpropyl)methacrylate (TMSPM) and of 5.0896 g of polyethylene glycol (PEG from Loba Chemie having MW 600) by heating at 100° C. for about 35 min. Then 0.0372 g of benzoyl peroxide (BP), 0.0220 g of dicumyl peroxide (DCP) and 2.6459 g (0.0172 mole) of methacrylic acid anhydride (MAAN) were added to the glass ampoule and sealed in air (mole ratios: TMSPM:PEG=1:1.52; TMSPM:MAAN=1:2.05). After stirring the reaction mixture for about 30 min at ambient temperature, the solution was heated in an oven according to Table 17.

TABLE 17

| Temp (° C.) | Time (h) |
| --- | --- |
| 50 | 15 |
| 60 | 6.5 |
| 80 | 17 |
| 100 | 20 |
| 120 | 12 |
| 150 | 3 |

The yield of the transparent nanocomposite solid product was 96.4%. Physical properties of the sol-gel-polymer composite are provided in Table 18.

TABLE 18

Physical properties of sol-gel-polymer composite of Example 9.

| d (g/cm$^3$) | CTE (25-90° C.) | TGA/DSC data | | | Amount of inorganic moiety (SiO$_2$) |
| --- | --- | --- | --- | --- | --- |
| | | Start of degradation | Loss of mass between 30 and 200° C. | Residual mass @ 600° C. | |
| 1.22 | 171 ppm/° C.$^{-1}$ | 176° C. | — | 3.70% | 4.20 |

Example 10

Sol-gel-polymer Composite. The inner walls of an ampoule were hydrophobized with a solution of dichlorodimethylsilane (DCDMS) in dry decane.

A solution was prepared from the mixture of 3.00 g (0.0121 mole) of 3-(trimethoxysilylpropyl)methacrylate (TMSPM) of 1.1247 g (0.0181 mole) of ethylene glycol (EG) by its heating at 100° C. during 3 h. Then 78.5% (wt.) of methyl alcohol (by-product) was evaporated from the transparent homogeneous reaction mixture and 0.0229 g of benzoyl peroxide (BP), 0.0142 g of dicumyl peroxide (DCP) and 1.5856 g (0.0103 mole) of methacrylic acid anhydride (MAAN) were added in a glass ampoule which was sealed in air (mole ratios: TMSPM/EG=1/1.50; TMSPM/MAAN=1/0.85). After stirring the reaction mixture for 0.5 hr. at ambient temperature, the transparent solution was heated in an oven according to the Table 19.

TABLE 19

| Temp (° C.) | Time (h) |
| --- | --- |
| 45-50 | 6 |
| 60 | 20 |
| 80 | 15 |
| 100 | 4 |
| 120 | 2 |
| 135 | 0.5 |

The yield of the solid transparent nanocomposite product was 99.0 wt. %. Physical properties of the sol-gel-polymer composite are provided in Table 20.

TABLE 20

Physical properties of sol-gel-polymer composite of Example 10.

| d (g/cm$^3$) | CTE (25-90° C.) ppm/° C.$^{-1}$ | TGA/DSC data | | Surface hardness Shore D |
| --- | --- | --- | --- | --- |
| | | Start of degradation ° C. | Residual mass @ 600° C. | |
| 1.33 | 83 | 330 | 20.00% | 89 |

Comparative Example 11

Synthesis of model pure organic polymer to compare properties with the hybrid composite based on TEOS and Diols. A transparent solution was prepared from the mixture 11.1296 g (0.0975 mole) of ethyl methacrylate (EMA), 2.6204 g (0.0108 mole) of diethylene glycol dimethacrylate (DED), 0.0694 g of benzoyl peroxide (BP) and 0.0377 g of dicumyl peroxide (DCP). The transparent solution was heated in an oven according to the Table 21.

TABLE 21

| Temp (° C.) | Time (h) |
| --- | --- |
| 45-50 | 2 |
| 60 | 1 |
| 80 | 2 |
| 100 | 2 |
| 120 | 1 |

Physical properties of the model organic polymer are provided in Table 22.

TABLE 22

Physical properties of the model organic polymer of Comparative Example 11.

| d (g/cm$^3$) | CTE (25-90° C.) | TGA/DSC data | | Surface hardness Shore D |
| --- | --- | --- | --- | --- |
| | | Start of degradation ° C. | Residual mass @ 600° C. | |
| 1.14 | 97 ppm/° C.$^{-1}$ | 213 | 00.00% | 84 |

Comparative Example 12

Synthesis of model pure organic polymer to compare properties with the hybrid composite based on TMSPM and Diols. A solution was prepared from the mixture 8.8001 g (0.0879 mole) of methyl methacrylate (MMA), 1.1750 g (0.0055 mole) of diethylene glycol diacrylate (DAD) and 0.0367 g of benzoyl peroxide (BP). The transparent solution was heated in an oven according to the Table 23.

TABLE 23

| Temp (° C.) | Time (h) |
|---|---|
| 45-50 | 2 |
| 60 | 1 |
| 80 | 2 |
| 100 | 2 |
| 120 | 1 |

Physical properties of the comparative model organic polymer are provided in Table 24.

TABLE 24

Physical properties of the model organic polymer of Comparative Example 12.

| d (g/cm$^3$) | CTE (25-90° C.) | TGA/DSC data | | Surface hardness Shore D |
|---|---|---|---|---|
| | | Start of degradation ° C. | Residual mass @ 600° C. | |
| 1.20 | 82 ppm/° C.$^{-1}$ | 240 | 00.00% | 85 |

TABLE 25

Comparison of properties of the comparative model polymers and sol-gel-polymer composites.

| Example # | SiO$_2$ after burn out of organic part (Wt.%) | $T_{degradation}$ (° C.) | CTE x 10$^{-6}$/ ° C. | Density (g/cm$^3$) | Surface hardness Shore D |
|---|---|---|---|---|---|
| 11 (model organic polymer) | 0.0 | 213 | 97 | 1.14 | 84 |
| 2 | 10.9 | 250 | 129 | 1.24 | 85 |
| 3 | 10.2 | 260 | 131 | 1.20 | 83 |
| 12 (model organic polymer) | 0.0 | 240 | 82 | 1.20 | 85 |
| 7 | 14.4 | 315 | 142 | — | 80 |
| 10 | 17.9 | 330 | 83 | 1.33 | 89 |

The disclosure has been described with reference to various specific embodiments and techniques. However, it should be understood that many variations and modifications are possible while remaining within the spirit and scope of the disclosure.

What is claimed is:

1. A method for making a composite comprising:
   a first reacting of a mixture comprised of:
   i) an alkoxide compound of the formula $R_xM(OR^1)_{m-x}$, where M is Si, Ti, Ta, Sn, Al, Zr, Hf, or a combination thereof,
   R, if present, is a hydrocarbyl group having from 1 to about 10 carbon atoms, or an unsaturated hydrocarbyl group having from 1 to about 10 carbon atoms,
   $OR^1$ is each independently an alcoholysable hydrocarbyloxy group having from 1 to about 10 carbon atoms,
   x is 0 to 4, and
   m is 1 to 5, and
   ii) a diol of the formula HO—$R^2$—OH, or an alcohol of the formula HO—$R^3$, where
   $R^2$ is a divalent hydrocarbyl group having from 1 to about 10 carbon atoms, or a polymeric group;
   $R^3$ is a polymerizable unsaturated hydrocarbylene group having from 3 to about 18 carbon atoms, or
   a mixture of a diol of the formula HO—$R^2$—OH and an alcohol of the formula HO—$R^3$; and
   a second reacting of a mixture comprising the resulting product of the first reacting and a mixture comprised of an unsaturated anhydride, a cross-linker, and a free-radical initiator.

2. The method of claim 1 wherein the first reacting is accomplished with heating from about 50 to about 150 degrees C, for about 0.5 to about 5 hours, and the second reacting is accomplished with heating at an increasing temperature of from about 45 to about 150 degrees C, over a period of for about 20 to about 100 hours.

3. The method of claim 1 wherein the alkoxide comprises at least one of 3-(trimethoxysilylpropyl) methacrylate, tetraethoxysilane, triethoxyvinylsilane, styrylethyltrimethoxysilane, tetramethoxysilane, titanium ethoxide, titanium isopropoxide, aluminum triethoxide, aluminum tributoxide, tin tert-butoxide, hafnium butoxide, tantalum ethoxide, aluminum isopropoxide, zirconium ethoxide, zirconium propoxide, or a combination thereof.

4. The method of claim 1 wherein the diol comprises at least one of ethylene glycol, polyethylene glycol, 1,2-propylene glycol, poly(propylene glycol), polyurethane diol, polycarbonate, bisphenol, alkoxylated bisphenol diol, or a combination thereof, the alcohol comprises at least one of 2-hydroxyethyl acrylate (HEA), 2-hydroxyethyl methacrylate (HEMA), or a combination thereof, the unsaturated anhydride comprises the anhydride of at least one unsaturated acid selected from an acrylic acid, an alkyl acrylic acid, crotonic acid, itaconic acid, maleic acid, or a combination thereof, the cross-linker comprises at least one of a dialkylene glycol diacrylate, a trimethylolpropane ethoxylate triacrylate, divinylbenzene, or a combination thereof, the free-radical initiator comprises at least one of a thermopolymerization initiator, a photopolymerization initiator, or a combination thereof.

5. The method of claim 1 wherein the first reacting and second reacting being accomplished free of any added solvent or diluent, and the method being accomplished in a single vessel.

6. The method of claim 1 wherein, if tetraethoxysilane (TEOS) is selected as the alkoxide compound in combination with a glycol, or if tetraethoxysilane (TEOS) is selected as the alkoxide compound in combination with hydroxyethyl methacrylate (HEMA), hydroxyethyl acrylate (HEA), or both acrylates, then a non-transparent or translucent monolithic product is obtained.

7. The method of claim 1 wherein, if trimethoxysilyl propylmethacrylate is selected as the alkoxide in combination with a glycol or in combination with hydroxyethyl methacrylate(HEMA), hydroxyethyl acrylate (HEA), or both acrylates, then a transparent monolithic product is obtained.

8. The method of claim 1 wherein the composite is a non-meltable, homogeneous solid.

9. The method of claim 1 wherein the second reacting being accomplished until the solid product has a constant weight.

* * * * *